(12) United States Patent
Fernandes et al.

(10) Patent No.: US 11,047,189 B2
(45) Date of Patent: Jun. 29, 2021

(54) AUTONOMOUS UNIT LAUNCHING SYSTEM FOR OIL AND GAS WELLS LOGGING, METHOD OF INSTALLATION AND UNINSTALLATION OF SAID AUTONOMOUS UNIT IN THE SYSTEM AND RESCUE SYSTEM

(71) Applicant: INSFOR - INNOVATIVE SOLUTIONS FOR ROBOTICS LTDA. - ME, Rio de Janeiro (BR)

(72) Inventors: Paulo Dore Fernandes, Niteroi (BR); Julio Quadrio de Moura Guedes, Rio de Janeiro (BR); Alexandre Ormiga Galvão Barbosa, Rio de Janeiro (BR); Daniel Zacarias Freitas, Rio de Janeiro (BR)

(73) Assignee: INSFOR—INNOVATIVE SOLUTIONS FOR ROBOTICS LTDA.—ME, Rio de Janeiro (BR)

( * ) Notice: Subject to any disclaimer, the term of this patent is extended or adjusted under 35 U.S.C. 154(b) by 235 days.

(21) Appl. No.: 15/572,260

(22) PCT Filed: Sep. 19, 2017

(86) PCT No.: PCT/BR2017/050275
§ 371 (c)(1),
(2) Date: May 25, 2018

(87) PCT Pub. No.: WO2019/033183
PCT Pub. Date: Feb. 21, 2019

(65) Prior Publication Data
US 2020/0157909 A1    May 21, 2020

(30) Foreign Application Priority Data

Aug. 15, 2017 (BR) .......................... 1020170175260

(51) Int. Cl.
*E21B 23/08* (2006.01)
*E21B 34/02* (2006.01)
(Continued)

(52) U.S. Cl.
CPC .............. *E21B 23/08* (2013.01); *E21B 31/18* (2013.01); *E21B 33/072* (2013.01); *E21B 34/02* (2013.01);
(Continued)

(58) Field of Classification Search
CPC ........ E21B 31/00; E21B 31/12; E21B 31/125; E21B 31/18; E21B 33/072
See application file for complete search history.

(56) References Cited

U.S. PATENT DOCUMENTS

| | | | | |
|---|---|---|---|---|
| 4,681,168 A | * | 7/1987 | Kisling, III | ........... E21B 33/072 166/381 |
| 6,059,042 A | * | 5/2000 | Huber | ................... E21B 17/046 166/377 |

(Continued)

*Primary Examiner* — Blake E Michener
(74) *Attorney, Agent, or Firm* — Malin Haley DiMaggio & Bowen, P.A.

(57) ABSTRACT

A launching system for an autonomous unit (RAU) carrying a logging tool for oil and gas well logging robotic, said system comprising a main body provided with first and second control valves and a draining valve, sensors and a end cap electrically connected to a control room for transmission of the data collected by the logging tool carried by the RAU, said End Cap collecting data and charging the electrical battery of the robotic autonomous unit (RAU) carrying said logging tool to be launched by said main body and performing a schedule of logging tasks in the well; and a connection for a wellhead. The method for installation and uninstallation of the autonomous unit in the said system as well as a rescue system for the said robotic autonomous unit in case of hindered motion of the RAU for any reason are also described.

9 Claims, 5 Drawing Sheets

(51) Int. Cl.
  *E21B 47/09* (2012.01)
  *E21B 23/00* (2006.01)
  *E21B 31/18* (2006.01)
  *E21B 33/072* (2006.01)
  *E21B 47/12* (2012.01)
  *G01V 11/00* (2006.01)
  *E21B 49/00* (2006.01)

(52) U.S. Cl.
  CPC .............. *E21B 47/09* (2013.01); *E21B 47/12* (2013.01); *G01V 11/002* (2013.01); *E21B 23/001* (2020.05); *E21B 49/00* (2013.01)

(56) References Cited

U.S. PATENT DOCUMENTS

| | | | |
|---|---|---|---|
| 6,405,798 B1 | 6/2002 | Barrett et al. | |
| 6,446,718 B1* | 9/2002 | Barrett | E21B 17/028 166/250.01 |
| 6,845,819 B2 | 1/2005 | Barrett | E21B 17/028 166/250.01 |
| 9,528,348 B2 | 12/2016 | Miller | |
| 9,957,789 B2* | 5/2018 | Hallundbæk | E21B 23/00 |
| 2003/0029618 A1* | 2/2003 | Schempf | E21B 23/00 166/343 |
| 2003/0234110 A1* | 12/2003 | McGregor | E21B 34/14 166/373 |
| 2005/0269081 A1* | 12/2005 | Rose | E21B 31/18 166/255.1 |
| 2007/0227741 A1* | 10/2007 | Lovell | E21B 23/14 166/380 |
| 2009/0159273 A1* | 6/2009 | Guerrero | E21B 33/068 166/250.01 |
| 2009/0242203 A1* | 10/2009 | Pardey | E21B 31/18 166/301 |
| 2012/0048552 A1* | 3/2012 | MacDougall | E21B 47/12 166/301 |
| 2012/0138312 A1* | 6/2012 | Strong | E21B 43/16 166/377 |
| 2013/0105141 A1* | 5/2013 | Bernard | E21B 33/13 166/70 |
| 2013/0168081 A1* | 7/2013 | Yang | E21B 33/072 166/247 |
| 2013/0240197 A1* | 9/2013 | Hallundbæk | E21B 23/00 166/66.4 |
| 2013/0241741 A1* | 9/2013 | Hallundbæk | E21B 23/00 340/853.6 |
| 2016/0003033 A1* | 1/2016 | Coles | E21B 47/091 73/152.58 |
| 2017/0133124 A1* | 5/2017 | Thomas | E21B 17/00 |
| 2018/0209236 A1* | 7/2018 | Talgo | E21B 33/076 |

\* cited by examiner

STATE-OF-THE-ART

STATE-OF-THE-ART

INVENTION

END CAP

RESCUE SYSTEM

AUTONOMOUS UNIT LAUNCHING SYSTEM FOR OIL AND GAS WELLS LOGGING, METHOD OF INSTALLATION AND UNINSTALLATION OF SAID AUTONOMOUS UNIT IN THE SYSTEM AND RESCUE SYSTEM

CROSS REFERENCE TO RELATED APPLICATIONS

This application claims priority to PCT Application No. PCT/BR2017/050275, filed on Sep. 19, 2017, which claims priority to Brazilian Patent Application No. BR 10 2017 017526 0 filed on Aug. 15, 2017.

FIELD OF THE INVENTION

The present invention belongs to the field of equipment designed for oil and gas well logging, more specifically, to a launching system for an autonomous unit, said system comprising an instrumented mast from which it is possible to launch and withdraw or collect a subsurface robotic autonomous tool carrying a logging tool designed for well logging while the well is in operation.

BACKGROUND OF THE INVENTION

Well logging is a detection and recordation technique of the properties and features of geological formations crossed by a well. Physical properties of these formations are measured by tools taken into the well, usually by a logging wireline, see Harald Bolt, Wireline Depth Determination, Rev 3.3, April 2012, available from the Society of Professional Well Log Analysts web site, www.spwla.org.

Certain logging tasks can be performed during different steps of the well useful life, either in drilling, completion, production or abandonment.

With the aim of subsidizing technical or environmental studies logging is performed in oil and/or gas wells, production or water injection wells.

The well logging technique is well established in the oil industry, being utilized and developed since the nineteen twenties. On Sep. 5, 1927, the first documented logging operation was carried out by Schlumberger in a Pechelbronn (France) well, where the first electrical logging tool was employed for the measurement of rocks' electrical resistivity.

In industry, the most widely utilized method for descent of the logging tool into the well is by an electrical cable or wireline, which is responsible for the lowering and withdrawal of the logging tool into the well, as well as by transmission of data and energy between the surface and the logging tool.

Lately, many wells are directionally drilled, with hugely inclined or horizontal stretches. For the logging tools to cross these stretches, in principle, drill pipes or coiled tubing were used. At present, techniques are known to couple logging tools to the drill string itself, continuously conveying information to the surface during well drilling by means of the drilling fluid itself. This technique is known as Logging While Drilling (LWD) or Measurement While Drilling (MWD).

An alternative for logging tools lowering in inclined or horizontal wells by wireline is to employ a traction device or tractor coupled to the logging tool, the tractor making it possible to displace the logging tool throughout the inclined or horizontal well stretch.

The conventional wireline logging method comprises three components:

At the surface, a central processing unit, this unit being in charge of supplying energy to the logging tool, as well as by the communication and data collection recorded by the tool;

At the surface, a traction unit which combined with the central processing unit, is in charge of descending and lifting the logging tool from the surface towards the well bottom and vice-versa so that the logging tool covers the well intervals to be investigated and/or collects information; and Bottom tool (logging tool) introduced in the well by a wireline, the tool being made up of apparatuses of different working principles (acoustic, radioactive, electrical, thermal, magnetic or optical) and further including one or more flowmeters for measuring flow rate and pressure sensors for collecting information on the rocks crossed by the well, such as permo-porous properties, mechanical properties, oil, gas and water saturations as well as the production flow rates for different intervals; and At the surface, the wireline logging method includes a safety equipment blow out preventer (BOP) to promote sealing of the well in case of undesired flow of fluids from the bottom to the surface to permit the withdrawing of the logging tool by wire without allowing the well to flow.

The oil and gas industry uses wireline logging to obtain a continuous record of the properties of rocks crossed by the well. Wire logging can be defined as the acquisition and analysis of geophysical data as a function of the well depth, together with the rendering of related services. Measurements are made referred throughout the well depth and can be used to infer further properties such as fluid saturation and permo-porous properties, as well as to aid in decision taking towards well drilling and production.

The logging tools record different petrophysical rock properties, by using a variety of working principles. Logging tools developed throughout the years are based on the detection of the natural rock gamma ray and on the electrical and acoustic properties of same. The logging tools further record the rock response towards radioactive, electromagnetic, nuclear magnetic resonance stimuli and other properties. Such logging tools are specified by the main property on which is based their working principle.

Data are recorded (in real-time) at the surface in electronic data format and then a printed record or electronic presentation called "log" is provided to the client, together with an electronic copy of the raw data.

Well logging operations can be performed during a few steps of the drilling process to provide information on the formations crossed by the well, or at the end of the drilling after the zone of interest is attained. Data are automatically recorded against the measured wire depth.

The measured wire depth can be derived from many different measurements but it is generally recorded based on a calibrated wheel counter or by utilizing magnetic marks which provide calibrated increments of wire length.

As for logging by robotic autonomous units, in the nineteen nineties, a few robot systems were patented, those being launched by cable or directly from the surface conveyed by any conventional method for performing a few tasks inside the well including a few logging tasks.

However, these patents do not detail any surface system for launching autonomous units to secure the well safety in case some undesirable flow occurs during the operation Further, these patents do not provide for the execution of activities in operating wells, either oil and/or gas production or water, steam or chemicals injection.

Since the nineteen nineties a few patents were published that contemplate the operation of robot autonomous systems for logging or several other tasks in oil wells; however, all the autonomous systems are launched by making use of state-of-the-art systems, that is, wireline, coiled tubing or tractor.

U.S. Pat. No. 6,446,718 teaches a well tool for logging and/or correction operations in a well of a hydrocarbon reservoir. The tool comprises an autonomous, controlled unit for measuring well conditions. The autonomous unit comprises displacement means for providing movement throughout the well, means for detecting well conditions and logic means for controlling the unit. The logic means that it can make decisions based on at least two inlet parameters. The tool can be connected to a surface fixed unit or launched from the surface. The connecting system between the two units can be repeatedly operated under well bottom conditions and preferably includes an active component for disconnection. The strongest emphasis of this U.S. patent document is on the fact that a logging tool lowered by wire can cross a horizontal or high inclination stretch by means of a tractor coupled to the logging tool.

U.S. Pat. Nos. 6,845,819 and 6,405,798 describe approaches like that of U.S. Pat. No. 6,446,718. These documents relate to a robot unit for displacement in oil wells aiming at repairing or various logging operations. The specification is directed to an invention for cased wells without a string in the interior and without diameter variations throughout the well path.

U.S. Pat. No. 9,528,348B2 relates to a system for launching a power system for supplying a bottom tool lowered by cable, wireline or coiled tubing.

Patents filed throughout the last decades related to autonomous units designed for well tasks, due to the launching systems used, all of them state-of-the-art techniques and already discussed above in the present specification, do not contemplate several possibilities such as operation with the well in operation (production or injection), equipped with tubing, with variations in diameter, open hole completion (without casing) and with sand control screens. Besides, said launching systems are not capable of securing the well safety in case some undesirable flow occurs during the operation.

SUMMARY OF THE INVENTION

The present invention relates to a launching system (mast) for remote autonomous units carrying tools for performing any subsurface task in oil wells. The wells are producing or injection wells. The wells are in operation or closed and at any kind of completion. The wells are vertical, horizontal or inclined. The system of the invention is workable without withdrawing the well Christmas Tree, that is, it is possible to log with the well in operation (production or injection).

Broadly, the launching system (mast) according to the invention comprises: a) a body of general circular section, the length of same being adapted to the length of the autonomous tool or unit to be lowered in the well while the diameter is adapted to be compatible with the Christmas Tree or any other equipment connected to the well head; b) at the upper end of said mast, an End Cap for communicating with the said autonomous unit designed for well tasks, the connection of said End Cap to said upper end being done or undone following the launching progress of said autonomous unit; and c) at the distal end of said mast, a wellhead connection to couple said mast to the wellhead.

More specifically, the launching system of autonomous unit (mast) for well task which is the object of the invention comprises:
 a) a main body of generally cylindrical shape serving as a launching duct for a robotic autonomous unit RAU carrying a logging tool, and wherein: (i) the upper portion of said main body is provided with a first control valve or upper valve; (ii) the lower portion of said body is provided with a second control valve or lower valve, both valves enabling the controlled passage of the logging tool carried by the said robotic autonomous unit RAU; (iii) a third valve at the lower end of said body for draining fluids from the interior of said body after the logging operation and before the uninstalling of same; and (iv) presence devices selected among electromagnetic, optical, inductive or radio-frequency sensors, inserted internally or externally to the launching system through the said main body to detect the presence of the autonomous unit RAU at the surface, the detected change leading to the occurrence of an electrical signal that engages an alarm such as a ring or luminous signal;
 b) at the upper end of said body an End Cap provided with attaching means to the said main body and electrically connected to a control center for transmitting data collected by said logging tool transported by said RAU, said End Cap serving for (i) collecting data and charging the electrical battery of said robotic autonomous unit RAU and (ii) obtaining electronic communication with the autonomous unit RAU to be launched by said main body and deploy logging operations in the well; and
 c) a well head connection, said connection being provided with attaching means at one end of same to the lower end of said main body and, at the distal end of same, of attaching means to the wellhead to permit the installation of said system onto the surface equipment.

The surface equipment is a Christmas Tree, BOP, Casing Head or other.

The length of the launching mast object of the invention is adjustable to that of the autonomous unit which will operate in the well, to this end said mast being subdivided in sections interconnected by any means.

And the method for installation and uninstallation of the autonomous unit designed in the present invention by RAU (from Robotic Autonomous Unit) in the launching system of the invention comprises the following steps:
 a) Providing a launching system comprising a main body, an end Cap and a well head connection;
 b) With the aid of said well head connection, coupling the said launching system to a wellhead;
 c) Installing the said RAU in the interior of said main body of the launching system with the upper control valve open and the lower control valve closed, the RAU being housed between the two said valves;
 d) Installing the said End Cap at the upper end of the said main body of the said launching system;
 e) Opening the lower control valve of the main body and the swab valve or any other flow control valve of the Christmas Tree so that the autonomous unit RAU is launched and the logging tool starts its task in the well;
 f) After the end of the well task, conveying the autonomous unit RAU back to surface, and ascertaining its attainment of the system by the emission of a sound or visual warning;

g) Closing the flow control valve of the Christmas Tree so that the launching system is hydraulically isolated from the well;

h) Opening the upper valve of the lunching system to allow the upper end of the RAU to be housed in the said End Cap;

i) With the upper end of the RAU housed at the said End Cap, recharging the RAU battery and collecting produced data, returning the RAU to the well if necessary;

j) At the end of the process, opening the draining valve to flow the fluids which will have penetrated the launching system during the operation;

k) After the system draining through valve, closing the lower valve and disconnecting said system from the well head; and l) With the launching system disconnected from the wellhead, withdraw and disassemble the set system RAU.

The flow control valve of the Christmas tree is the swab valve or any other that isolates the mast from the Christmas tree.

Thus, the invention provides an operational system for autonomous unit for tasks in oil and gas wells without the need of withdrawing the Christmas tree from the well.

The invention provides further an operational system for autonomous units carrying tools for tasks in oil and gas wells, the wells being vertical, horizontal or inclined.

The invention provides also an operational system for autonomous units carrying tools for tasks in oil and gas wells, said system being operational with the well under flow.

The invention provides also an operational system for launching a wellbore working tool carried by autonomous systems, aiming at deploying and/or un-deploying downhole valves, either for well closure or control or artificial lifting; bridge plugs, packers or any other kind of subsurface equipment, either for well drilling, completion, evaluation, stimulation, restoration or operation (production or injection).

The invention also provides an operational system for launching logging tools of any kind, either based on acoustic, electrical, magnetic, radioactive, optical or any combination of these principles, said tools being carried by an autonomous system housed in the present system.

The invention provides additionally an operational system for launching an autonomous unit carrying wellbore working tools for oil and gas well tasks, the wells being open hole, cased, cemented and perforated, vertical, inclined or horizontal, of constant diameter or variable along their path.

DETAILED DESCRIPTION OF THE INVENTION

Throughout this specification and claims, the expressions "autonomous unit" or "autonomous tool" are equivalent and used indistinctively.

Further, during the present specification, the launching system which is the object of the invention is called launching mast or mast and therefore the expressions launching system and launching mast or mast should be considered as equivalent for the purposes of the invention.

The first aspect of the invention is the launching system of the autonomous unit designed to perform tasks in oil and gas wells, the system being generally designed by the numeral 100.

Figure 1:
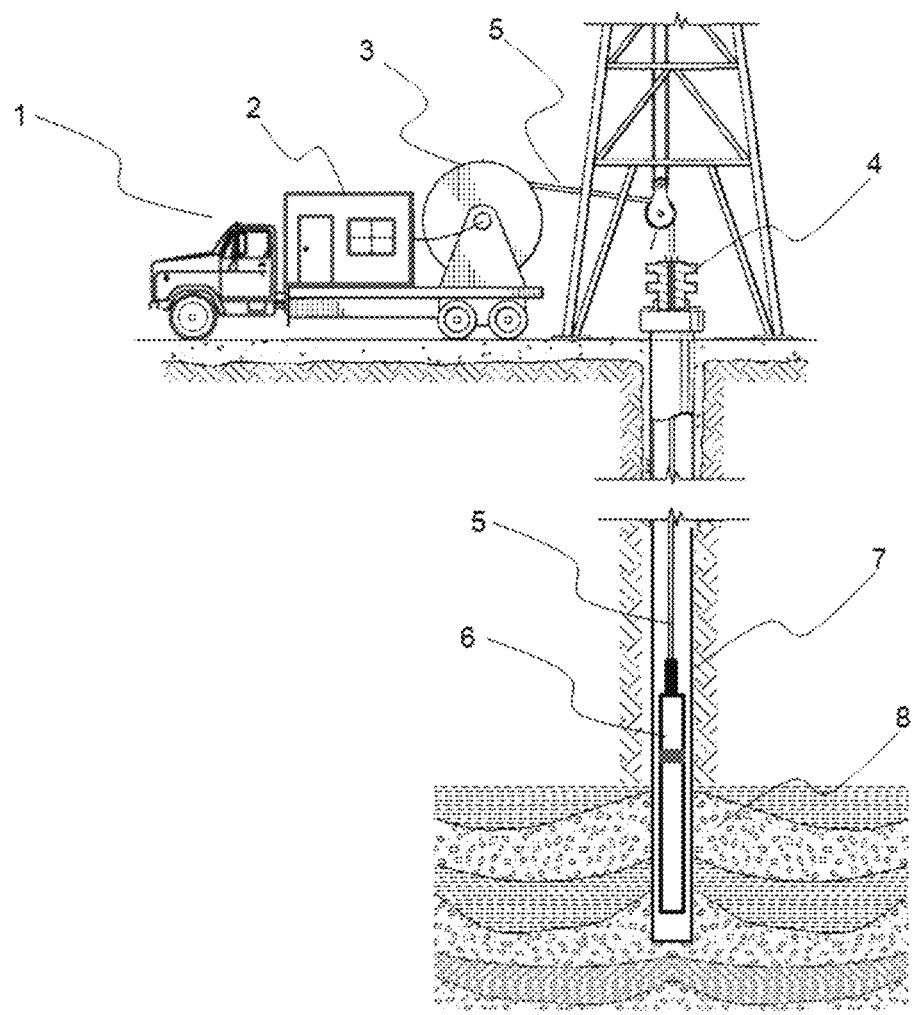
FIG. 1 depicts a schematic drawing of the state-of-the-art wireline logging process.

FIG. 1 attached shows a schematic drawing of wireline logging as practiced in the state-of-the-art technique. At the surface, a logging unit 1 comprises a central processing unit 2 including a data collecting, storing and analysis computerized system, as well as an electrical energy source for feeding a logging tool 6. The surface unit further comprises a wire traction system (winch) 3. At the well head (not represented) is installed a safety equipment designed by wire BOP 4, which can also include a lubricating system to allow the withdrawal of the logging cable 5 while the well is under flow. The logging wire 5 is in charge of the descent of the logging tool 6 throughout the well, the well wall 7 being either a casing or the contact area between the well and the rock itself crossed by the well, which features an open-well completion. The logging tool 6, which can use different working principles, measures specific properties of the rocks crossed by well 7 and of the zones of interest 8 carrying hydrocarbons and/or water.

Figure 2:
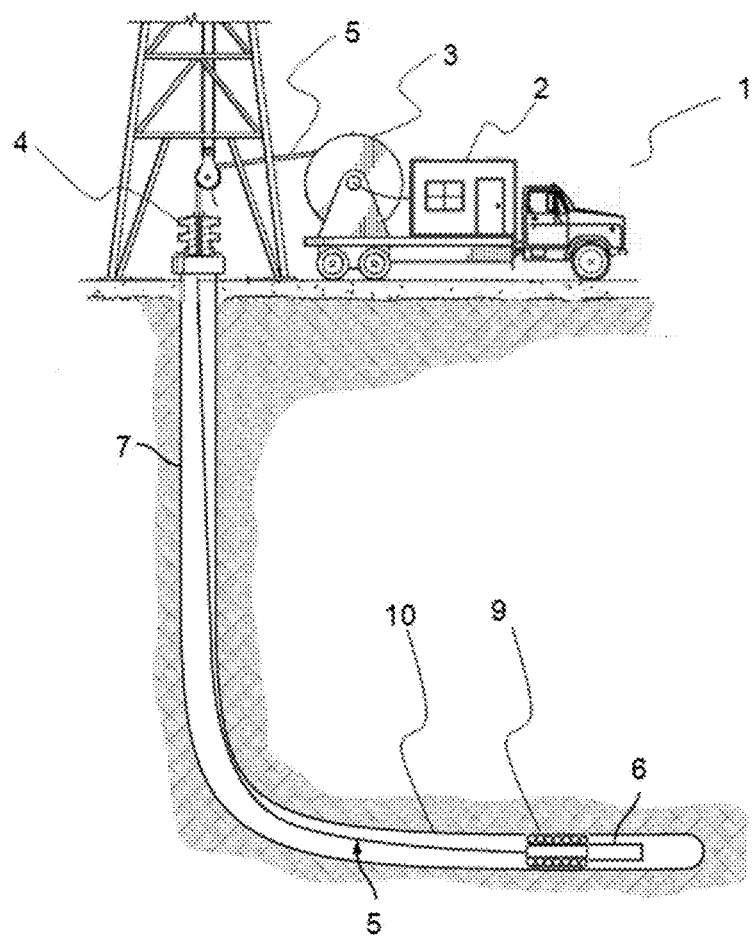
FIG. 2 shows a schematic drawing of a wireline-lowered state-of-the-art logging tool coupled to a tractor to cover a high inclination well stretch.

FIG. 2 shows a further state of the art technique for the descent of logging tools into a well, in this case a high inclination well. Thus, a logging tool 6 is lowered by wire 5 coupled to a tractor 9 to cross a high inclination or horizontal well 10.

The present invention will now be described in relation with the attached Figures, which should not be construed as limiting same.

Figure 3:
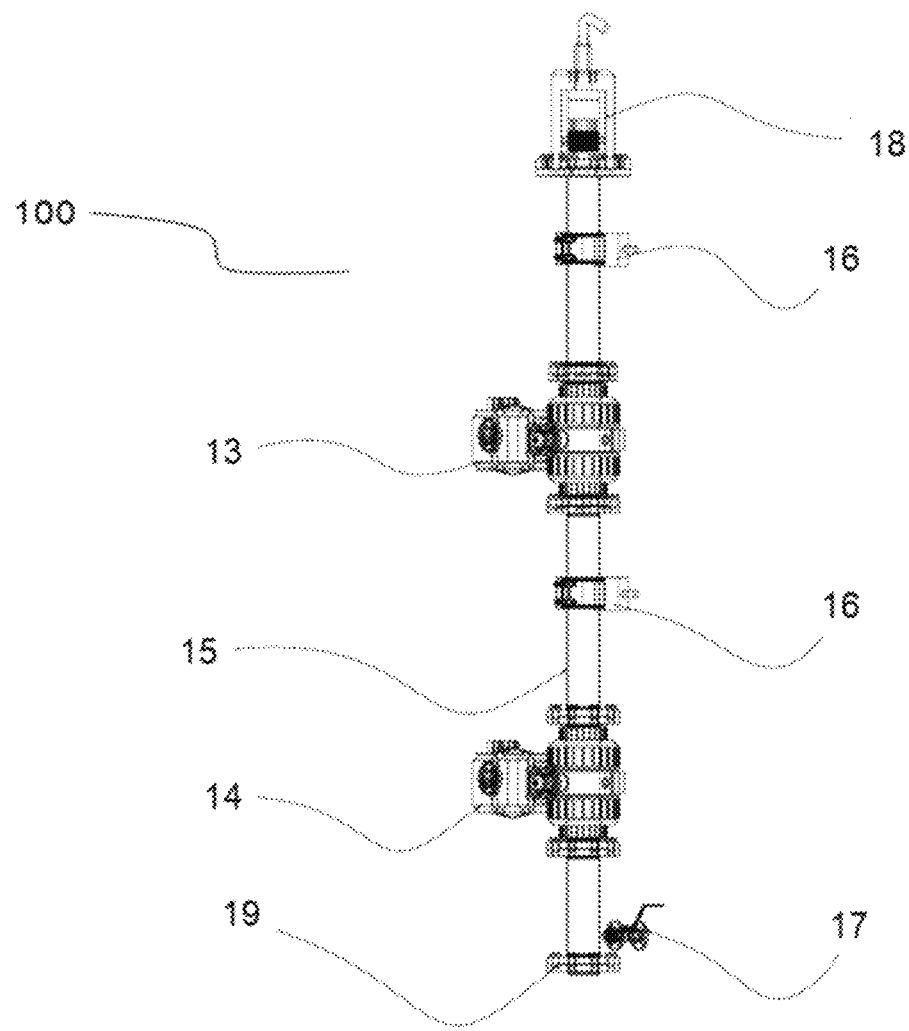
FIG. 3 shows a front elevational view of a launching system or mast in accordance with the invention.

The launching system 100 of autonomous tools for tasks in oil and gas wells is illustrated in FIG. 3.

According to FIG. 3, the main body 15 is the main component of system 100, being made up of a tubular structure of circular section, preferably metallic but not limited to this kind of material. Body 15 can be subdivided in various tubular, interconnected sections to adjust the body 15 to the length suitable for the tool designed for operation in the well, the tubular structure or body 15 serving as housing and launching pipe for an autonomous unit RAU carrying a logging or wellbore working tool.

On the other hand, the diameter of body 15 is adapted for being compatible with a Christmas Tree or any other surface equipment.

Along the main body 15 are disposed components which make up the mast or system 100. The remaining components which constitute the system 100 will be described below in the present specification.

In the same FIG. 3 first, upper control valve 13 and second, lower control valve 14 positioned respectively at the upper portion and at the lower portion of body 15 are safety barriers which keep the tightness and safety of the well during execution of the autonomous tool (RAU) (not represented) tasks at the subsurface, said valves 13, 14 being (i) opened only for launching and withdrawing of the robotic autonomous unit; and (ii) flow control generic, safety valves, engaged either manually or remotely.

Control valves 13, 14 enable the controlled passage of the logging tool carried by the autonomous unit through the well head without the need to interrupt flow.

The respectively first and second control valves 13, 14 are connected to body 15 by flanges, threads or any other type of mechanical connection.

Presence sensing devices 16 are optical, inductive or radio frequency principle sensors. Sensors 16 are inserted internally or externally to mast 100 through main body 15. Devices 16 are generally positioned along main body 15 to be each positioned near control valves 13, 14.

Sensors 16 indicate the proximity of the autonomous unit (not represented) to the surface so that the autonomous unit arrival can be monitored at the end of the tasks for which it has been scheduled. When this occurs, the autonomous tool RAU reduces its displacement speed from the well (not represented) and is housed in the interior of body 15 of mast or system 100. The displacement system of said autonomous tool or unit is then deactivated and an electrical connection is established between said autonomous unit and the finishing component of the upper portion of main body 15, said finishing component being End Cap 18.

Draining valve or lower drain 17 positioned at the lower end of main body 15 is designed to drain, before the uninstallation of the launching system 100, the residual fluids which could penetrate said main body 15 during the operation. Valve or drain 17 is connected externally to that main body 15 by means of a thread or flange or any other mechanical connection device (not represented).

End Cap 18 is provided with an electronic system for activation or shut down (not represented) of the autonomous unit, said system being automatic or manual, according to the operator need. Activation or shut down will be carried out externally to the system or launching mast 100. It is not necessary for the autonomous unit to be kept activated without need. The same applies to opening/closing valve operations for starting or finishing the scheduled task. Activation is performed remotely by means of dedicated electronics and the shutting down will be automatically done by sensors (for example, an inductive proximity sensor) installed in said autonomous unit.

Figure 4:
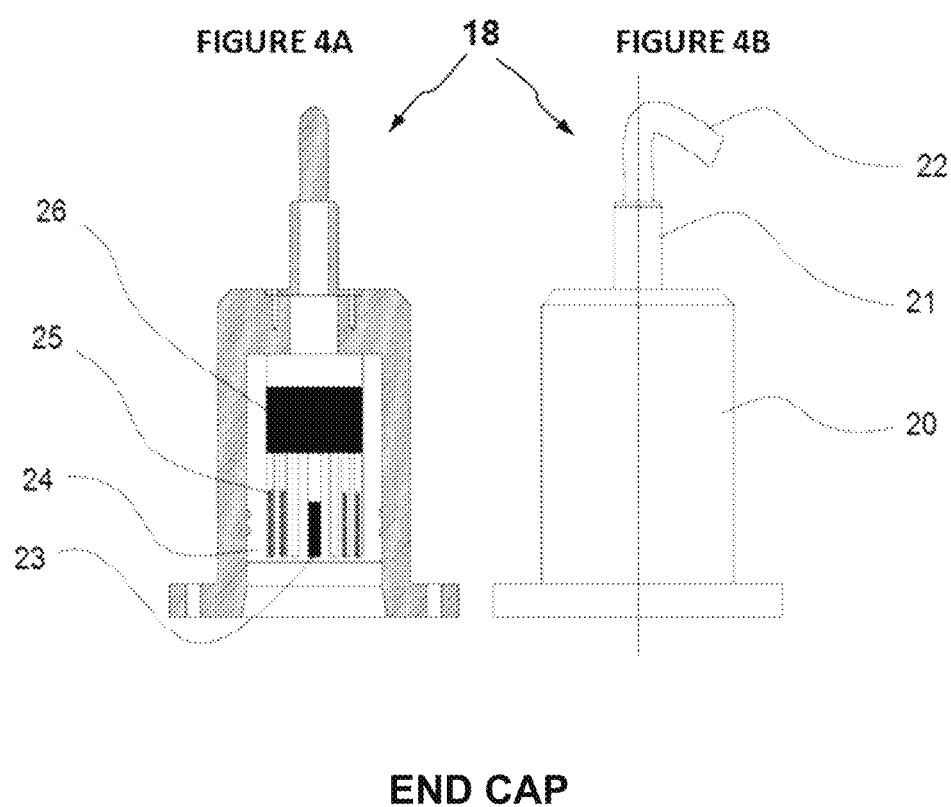
FIGS. 4A and 4B illustrate schematic drawings of the End Cap, positioned at the upper end of the mast to provide electronic access to the autonomous tool (RAU), data transmission and electric current feeding of the RAU battery.

FIGS. 4A and 4B detail the End Cap 18. A control center (not represented) provides the electrical connections with End Cap 18 for transmitting data collected by the logging tool carried by the RAU as well as the recharging of said RAU battery (not represented).

In FIG. 4A an inductive transceptor 23 provides serial communication with the autonomous unit with no need of electrical contact. Support 24 accommodates induction coils 25 and inductive transceptor 26 to secure the alignment for interface with the autonomous unit RAU. Induction coils 25 generate electromagnetic fields for charging the battery of autonomous unit(s) where electrical contact would be required. Control electronics 26 manages the autonomous unit RAU battery charging as well as the communication between said RAU and the said control center.

In FIG. 4B an external vessel 20 behaves as a mechanical structure for coupling the End Cap 18 and the upper end of mast 100. A penetrator 21 makes the electrical connection between said control center and the further End Cap 18 components in a sealed manner. The feeding and communication umbilical 22 promotes a connection with a control central (not represented) for data transmission and electrical feeding.

The method for installing the autonomous tool RAU in body 15 of mast 100 will be described below. As for the RAU, it should be clear to the experts that the RAU has not been represented in the Figures of the present specification and that it can be any device of the kind and of common use in the practice of the art, and therefore the RAU is not an object of the present application.

With the mast 100 installed in the wellhead and the upper valve 13 open, the RAU is inserted in the interior of the main body 15 of the said mast and then the End Cap 18 is attached to the upper end of same by means of a connection device. The RAU should include a transceptor (not represented) of an optical, magnetic or inductive nature. Beside each upper and lower valve 13, 14, are positioned transceptors which identify the positioning of the RAU relative to the body 15 of the mast 100. The autonomous unit is at first positioned and identified at the upper portion of said body 15. After the RAU approaches the sensor 16 which is close to lower valve 14, said valve is automatically opened enabling the RAU to leave the body 15 of the mast 100 and enter the well. After the RAU displacement and therefore its distancing from upper and lower valves 13, 14, these valves close automatically.

After performing tasks in the well, such as logging tasks, the RAU returns to the body 15 of the mast 100. In the return path, when the RAU approaches the lower valve 14, said valve opens automatically and after the RAU enters the body 15 of mast 100 valve 14 is closed. By the approach of the RAU of the upper valve 13, the RAU follows its schedule, being uninstalled or returning to the well to perform further tasks.

It is possible to convey data collected during the operation of the robot autonomous unit (RAU) in the well and stored in the RAU data module towards devices external to the launching system 100. This is done when the RAU is connected to End Cap 18, enabling data collection. Transmission is performed through conventional wire connectors, USB or serial, for instance, or with the aid of a Bluetooth device to a cell phone/tablet/computer or by wireless to a control central. A LED display (not represented) installed in End Cap 18 shows that data transmission is taking place between said End Cap 18 and the robot autonomous unit RAU positioned in the launching system 100.

With the RAU connected to the End Cap 18, the electronics for battery recharging is activated and checks the amount of charge stored in the RAU. Recharging decision making is automatic or manual. A LED display (not represented) installed in End Cap 18 indicates either the need for recharging, if the recharge is being executed or even if the charge is complete. Recharging will be carried out by induction so there is no need to open mast 100.

At the lower end of the main body 15 of mast 100, a mechanical adaptor or connector 19 promotes the connection of said body 15 with the wellhead (not represented). The wellhead is a Christmas tree, a Production Head, a Casing Head or Blow out Preventer (BOP). Connection 19 is a flange, a thread or any other kind of mechanical connection compatible with the wellhead.

According to the invention, a control central (not represented) positioned remotely to the well where the task, such as logging, is executed can communicate with several systems or launching masts 100 simultaneously with the aid of mesh networks (online or off-line), enabling wider reaching with less packs loss and at higher speed.

Through the control central and the communication with End Cap 18, an operator (not represented) positioned remotely to the well can check if the RAU is attached, confirm the charge of the RAU battery, recharge the batteries and further collect data stored or schedule tasks for the RAU.

The second aspect of the invention is the method of installation and uninstallation of the autonomous unit RAU (not represented) in the mast 100 to perform tasks, such as logging, in the well.

According to said second aspect, the preliminary step involves coupling the mast or launching system 100 to a wellhead.

The RAU is at first installed in the interior or the main body 15 with the upper control valve 13 open and the lower control valve 14 closed, the RAU being housed in the interior of the main body 15 between the two valves 13, 14. Following the RAU installation, with the required tools duly coupled (not represented) to the main body 15 of the mast 100, the End Cap 18 is connected and installed at the upper end of body 15 of said mast 100.

For the launching of the RAU, at first the flow control valve—selected among a swab valve or other—of the Christmas tree or wellhead (not represented) is opened. After the RAU approaches the sensor 16 of lower valve 14 said valve is automatically opened enabling the RAU to enter the well and start the tasks, such as logging. When the RAU is at a distance from valves 13, 14, said valves are automatically closed, the swab valve or any other flow control valve of the Christmas tree or well head being kept opened during the whole operation of the RAU in the well.

Upon return of the autonomous unit RAU to the surface and approach to the lower valve 14, said valve is automatically opened and after the entry of the RAU in mast 100 the lower valve 14 is closed. By continuing its ascending path through the main body 15, and when the RAU approaches the upper valve 13, said valve is opened and after identifying the RAU in the upper location of mast 100 the RAU is positioned in the End Cap 18.

It should be noticed that the flow control valve, such as a swab valve or any other valve of the kind, is closed only if the RAU is no longer intended to return to the well, that is, if the operation is concluded.

Housed in the End Cap 18, the battery of the autonomous unit RAU can be recharged, have data collected and return to the well if required following the same steps described above in the present specification. In case the well tasks are concluded, the swab valve or any other flow control valve of the Christmas Tree is closed and both the lower valve 14 and the drain or draining valve 17 are opened to let flow the fluids which could have penetrated the mast 100 during the operation. The system 100 can then be disconnected from the wellhead.

The description above confirms that contrary to other documents such as U.S. Pat. No. 9,528,348 B2 and other patent documents cited above in the present specification, the purpose of the present invention is a launching system for robot autonomous units (RAU) without need of wireline, coiled tubing or drilling or completion pipes. The system and method of the invention therefore enable any logging operation with the well in flow.

The third aspect of the invention is the utilization of a rescue system 30 provided with a Rescue End Cap (REC) 32 designed to replace End Cap 18 whenever it is impossible to move the RAU, the withdrawal of the RAU being required when it gets stuck consequent to any RAU damage or well obstruction.

Figure 5:
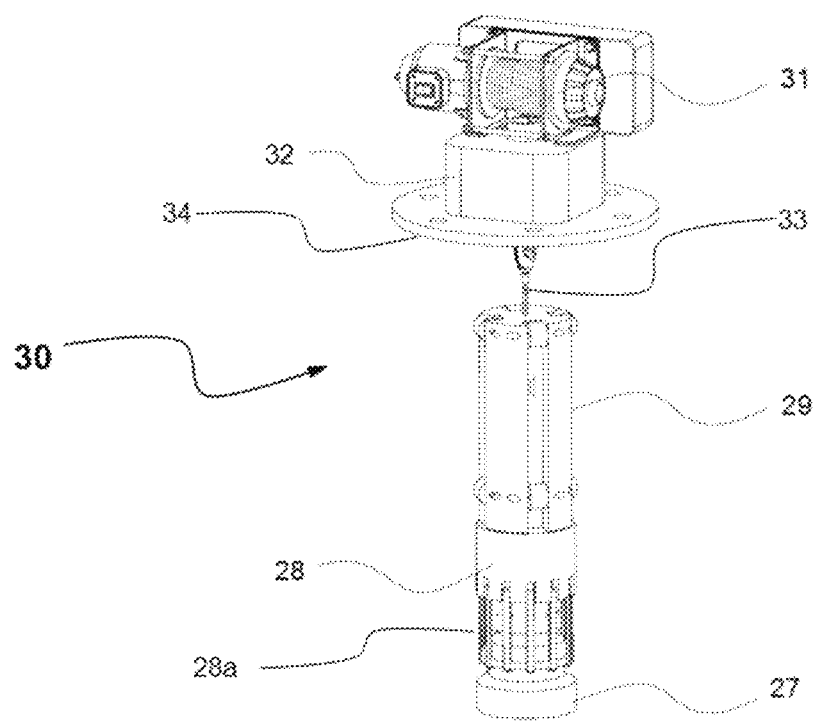
FIG. 5 shows a perspective view of a rescue system to be used in case of hindrance or lack of movement of the robotic autonomous unit (RAU) in the well, the rescue system freeing the RAU and permitting its withdrawal.

Rescue system 30 is illustrated in FIG. 5.

It should be clear for the experts that although the RAU is not represented in any Figure, the upper end 27 of it is schematically represented in FIG. 5 to make the connection between said end 27 and rescue tool 29 clear.

In rescue system 30 the main component is Rescue End Cap (REC) 32, a sealed structure for passage of coated steel wire 33 and flange 34 for attachment to mast 100.

Rescue system 30 comprises a powered spool 31 to unwind manually, locally or remotely said coated steel wire 33, said steel wire being coupled to a rescue tool 29. The powered spool 31 is attached to REC 32 and actuated manually, locally or remotely after the attachment of REC 32 to mast 100. Rescue tool 29 is provided with a wheel and/or belt displacement system and at the end of said rescue tool 29 is attached a coupling and attachment mechanism 28 provided with a set of tweezers 28a to surround and grab the stuck RAU. When rescue tool 29 approaches the upper end 27 of the RAU, a contact sensor (not represented) will be activated and convey a signal to the surface to inform that the RAU has been detected. Then the powered spool 31 will be activated to traction tweezers 28a of the coupling and attachment mechanism 28 and start the withdrawal of the RAU from the well.

After the impossibility of moving the RAU is detected, the End Cap 18 should be isolated from the well by closing the safety valves 13, 14 and immediately withdrawn from mast 100.

It should be noted that during the RAU operation the End Cap 18 is permanently coupled to main body 15. However, after the logging task, or in case of the RAU imprisonment, the End Cap 18 is disconnected from said main body 15.

With the safety valves 13, 14 opened and the swab valve or any other flow control valve of the Christmas tree (not represented) closed, the rescue tool 29 is inserted in the interior of mast 100 and then ECR 30 is installed and attached to the upper free end of mast 100. After checking the installation and displacement of the rescue tool 29 the swab valve or any other flow control valve of the Christmas Tree (not represented) is opened and the powered spool 31 frees the coated steel wire 33 to enable the rescue tool 29 to be lowered actively through the mast 100 and then through the well until the upper end 27 of the RAU is found and contacted.

The contact sensor (not represented) is activated by the proximity of the rescue tool 29 with the upper end 27 of the RAU conveying to the surface the information that the RAU withdrawal can be triggered.

Following the complete closure of tweezers 28a of the coupling and attachment mechanism 28 around the RAU the displacement of the rescue tool 29 becomes passive and the powered spool 31 starts the rescue of the RAU (not represented).

After the rescue tool 29 and the captured RAU enter the mast 100, the swab valve or any other flow control valve of the Christmas tree (not represented) is closed, isolating the mast 100 from the well.

The mast 100 should be freed from the well with the rescue system 30 installed and the rescue tool 29 and the RAU in the interior of said rescue system 30.

The invention claimed is:

1. A method of housing a cableless robotic autonomous unit (RAU) carrying an oil well logging tool within an oil well in a protective rigid tube comprising the steps of:
   a) using a protective rigid tube with an upper end and lower end, sized in diameter and length to receive, launch, house, and recover the cableless RAU carrying the logging tool, the logging tool capable of collecting logging tool data, the protective rigid tube comprising an upper valve and a lower valve;
b) installing the RAU and the logging tool into said protective rigid tube with said upper valve open and said lower valve closed;
c) attaching an end cap body, containing control electronics, to the protective rigid tube upper end, the end cap body being removably connectable to said protective rigid tube upper end;
d) using the control electronics in said end cap body 1) for managing an inductive coil in the end cap body for charging a battery in the RAU carrying the logging tool housed in said protective rigid tube near said end cap body and 2) managing communication of the logging tool data collected by the logging tool and receiving transmitted logging tool data transmitted from within said protective rigid tube from said logging tool;
e) launching the RAU and logging tool into the well from said protective rigid tube by opening said lower valve of said protective rigid tube;
f) monitoring and detecting the proximity of the RAU and logging tool to said protective rigid tube with at least one presence sensor connected to said protective rigid tube; and
g) using a fluid drain valve in the lower end of said protective rigid tube to drain fluids from said protective rigid tube when the RAU and the logging tool are positioned inside said protective rigid tube.

2. A launching, housing, and recovery system connectable to a wellhead in a production oil well for a cableless, battery powered, robotic autonomous unit (RAU) and a logging unit attached thereto for obtaining information from the ground areas surrounding an oil well downhole environment comprising:
   a rigid cylindrical main body, sized in diameter and length to receive and permit passage of a RAU and a logging unit attached thereto; said rigid cylindrical main body having an upper section, an upper opening, a lower section, and a lower opening;
   an upper valve connected across said rigid cylindrical main body upper section, sized when open to allow passage of a RAU and a logging unit attached thereto and configured to be closed while a RAU and logging unit are in operation in the downhole environment;
   a lower valve connected across said rigid cylindrical main body lower section and sized when open to allow passage of a RAU and a logging unit attached thereto and configured to be closed while a RAU and logging unit are in operation in the downhole environment;
   a third valve, connected to said rigid cylindrical main body near the lower opening and below the lower valve, to drain any fluids from the rigid cylindrical main body, after operation of a RAU and a logging unit attached thereto and prior to uninstallation of a RAU and logging unit;
   a first presence sensor, for sensing the presence of a RAU and a logging unit attached thereto, connected to said rigid cylindrical main body, between said upper valve and said lower valve, for sending an electrical signal detecting the presence of a RAU and a logging unit attached thereto, to a wellhead surface;
   an end cap having an end cap body connected to said rigid cylindrical main body upper opening, said end cap body housing control electronics including an inductive transceptor for:
      serial communications with a RAU and a logging tool attached thereto;
      managing communications of an inductive coil to in said end cap body to charge a nearby battery in a RAU and logging tool attached thereto when positioned near said end cap body;
      managing communication of a logging tool data; and
      receiving logging tool data transmitted from a nearby logging tool when said tool is positioned in said rigid cylindrical main body;
   a wellhead connection at the lower opening of said rigid cylindrical main body for installing said rigid cylindrical main body lower opening to a well head to permit installing and removing a RAU and a logging tool attached thereto at the wellhead;
   whereby a RAU and a logging tool attached thereto can position itself near said end cap, inside said rigid cylindrical main body, when said upper and lower valves are open, and a RAU and a logging tool attached thereto having a RAU battery can be charged when a RAU and a logging tool attached thereto is near said end cap by said end cap induction coil; and a logging having logging tool data that can be transferred to said end cap when a logging tool having logging tool data is near said end cap with said upper and lower valves in a closed position, preventing fluids from entering or leaving said cylindrical body.

3. The system as in claim 2, including:
   a second RAU presence sensor, connected to said rigid cylindrical main body, between said end cap and said upper valve, for transmitting an electrical signal to said wellhead surface upon detecting the presence of a RAU and a logging tool attached thereto in said rigid main cylindrical body.

4. A system as in claim 3, wherein:
   said first and second presence sensors for detection of the presence of a RAU and a logging tool attached thereto in said rigid cylindrical main body having radio frequency receivers and transmitters for sending the electrical signal to said wellhead surface.

5. An autonomous unit launching system for oil and gas well logging, wherein said system comprises:
   a) a cylindrical main body having an upper portion, a lower portion, an upper end and a lower end that is sized in diameter and length to house a cableless robotic autonomous unit (RAU) carrying a logging tool, said cylindrical main body having:
      (i) the upper portion of said cylindrical main body having an upper control valve, sized in the open position to allow passage of a RAU carrying a logging tool, and;
      (ii) the lower portion of said cylindrical main body having a lower control valve, sized to allow passage of a RAU carrying a logging tool, said upper and lower control valves for controlling the passage of a RAU carrying a logging tool and both control valves configured to be closed while a RAU and logging tool are in operation downhole, and further comprising:
      (iii) at the lower end of said cylindrical main body and below said lower control valve, a drainage valve to drain any fluid from an interior of said cylindrical main body, after a launching of a RAU carrying a logging tool from said cylindrical main body, and prior to a reception of a RAU carrying a logging tool in said cylindrical main body, and;

(iv) at least one presence device sensor selected from the group of electromagnetic, optical or radio-frequency, connected to said cylindrical main body to detect the presence of a RAU carrying a logging tool, by sending an electric signal that activates a sound or a luminous warning;

b) an end cap body removably fixed on the upper portion of the cylindrical main body above said upper control valve and including control electronics electrically connected to a control center to transmit data collected by a logging tool carried by a RAU, said end cap executing:
  (i) the collection of data collected by a logging tool carried by a RAU, and
  (ii) a communication with a RAU carrying a logging tool to perform the well tasks; and c) a connection at the lower end of the said cylindrical main body for fixing the cylindrical main body to a wellhead, whereby said cylindrical main body is not exposed to any subsurface pressures during the launching and the reception, in the cylindrical main body, of a RAU carrying a logging tool.

6. A system, according to claim 5, wherein the control electronics, housed in said end cap body fixed on the upper portion of said cylindrical main body, are coupled to the control center for processing data collected by a logging tool carried by a RAU.

7. A system, according to claim 5, said cylindrical main body being adjustably sized in length by one or more tubular interconnected sections for adjusting to the length of a RAU carrying a logging tool.

8. A system, according to claim 5, wherein said end cap body fixed on the upper end of the cylindrical main body further includes:
  (i) an outer vessel for coupling with the upper portion of said cylindrical main body;
  (ii) a penetrator for sealed electric connection between said end cap body and the control center;
  (iii) an umbilical for transmission of data collected by a logging tool carried by a RAU;
  (iv) an inductive transceptor for communication with a RAU carrying a logging tool;
  (v) an induction coil for generating an electric charge for a battery of a RAU; and
  (vi) the control electronics for managing the charge of a battery of a RAU and RF communication with the control center.

9. A method for launching a cableless RAU carrying a logging tool for performing logging tasks in a well using the launching system of claim 5, the method comprising the steps of:

a) providing the launching system for launching, housing, and recovering the RAU and logging tool, including the cylindrical main body, the end cap fixed on the upper portion to the cylindrical main body and said connection at the lower end thereof for connecting the main body to the wellhead;

b) coupling the launching system to the wellhead, using the connection at the lower end of the cylindrical main body;

c) inserting the cableless RAU carrying the logging tool into the cylindrical main body of the launching system, the upper control valve being open and the lower control valve being closed during said insertion, and wherein the cableless RAU carrying the logging tool can be stored between said upper and lower control valves;

d) installing the end cap body on the upper end to of the cylindrical main body of the launching system;

e) opening the lower control valve of the cylindrical main body to launch the RAU carrying the logging tool into a production well to begin well logging tasks;

f) while the RAU and logging tool perform the well logging tasks, closing the lower control valve of the cylindrical main body thereby hydraulically isolating the cylindrical main body from the production well;

g) after an end of the well logging tasks, moving the RAU carrying the logging tool towards the cylindrical main body of the launching system, and using the presence device sensor to detect a location of the RAU carrying the logging tool relative to the cylindrical main body;

h) opening the lower control valve of the cylindrical main body to receive the RAU carrying the logging tool and, after reception, closing the lower control valve of the cylindrical main body;

i) hydraulically isolating the launching system from the well upon reception of the RAU and logging tool;

j) opening the drainage valve to drain fluid within the launching system after the reception of the RAU carrying the logging tool;

k) opening the upper control valve to connect the RAU carrying the logging tool to the end cap body;

l) with the RAU carrying the logging tool, when positioned near the control electronics in the end cap body, charging a battery of the RAU carrying the logging tool, and collecting logging data obtained by the logging tool, and m) after steps (j), (k), and (l), closing the lower control valve, and disconnecting the launching system from the wellhead.

* * * * *